United States Patent
Lai et al.

(10) Patent No.: US 10,923,730 B2
(45) Date of Patent: Feb. 16, 2021

(54) ELECTRODEPOSITED COPPER FOIL WITH ANTI-BURR PROPERTY

(71) Applicant: CHANG CHUN PETROCHEMICAL CO., LTD., Taipei (TW)

(72) Inventors: Yao-Sheng Lai, Taipei (TW); Kuei-Sen Cheng, Taipei (TW); Jui-Chang Chou, Taipei (TW); Chien-Ming Lai, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/353,842

(22) Filed: Mar. 14, 2019

(65) Prior Publication Data

US 2020/0295378 A1     Sep. 17, 2020

(51) Int. Cl.

| | |
|---|---|
| *H01M 4/70* | (2006.01) |
| *H01M 4/66* | (2006.01) |
| *H01G 4/008* | (2006.01) |
| *H01M 4/04* | (2006.01) |
| *H01M 10/0525* | (2010.01) |
| *C25D 3/38* | (2006.01) |
| *C25D 1/04* | (2006.01) |

(52) U.S. Cl.
CPC .............. *H01M 4/70* (2013.01); *H01G 4/008* (2013.01); *H01M 4/0438* (2013.01); *H01M 4/661* (2013.01); *H01M 10/0525* (2013.01); *Y10T 428/12431* (2015.01)

(58) Field of Classification Search
None
See application file for complete search history.

(56) References Cited

U.S. PATENT DOCUMENTS 3,878,394 A * 4/1975 Golden .................. H01F 27/40
                                                        378/102
4,735,092 A    4/1988 Kenny
(Continued)

FOREIGN PATENT DOCUMENTS

| JP | H06-218691     | * | 8/1994 |
| JP | 2009-215570    | * | 9/2009 |
| KR | 20180038690 A  | * | 4/2018 |

OTHER PUBLICATIONS

English machine translation of JP2009-215570, EPO, accessed Jun. 11, 2019.*

(Continued)

*Primary Examiner* — Xiaobei Wang
(74) *Attorney, Agent, or Firm* — Nixon Peabody LLP; Thomas P. Pavelko

(57) ABSTRACT

Electrodeposited copper foils possessing properties for manufacturing lithium ion rechargeable secondary batteries are described, including methods of making the electrodeposited copper foils, methods for making the battery, and the resultant battery. The electrodeposited copper foils have a specific burst strength in the range of 1.5 to 4.3 kPa*m²/g and a tensile strength in the range of 30 to 40 kgf/mm². The deposited side of the electrodeposited copper foil has a surface hardness in the range of 0.2 to about 2.0 Gpa by nano indentation analysis to resist wrinkling during pressing of the active materials on the electrodeposited copper foil. The foil exhibits reduced copper burr formation and burr size after clipping.

11 Claims, 9 Drawing Sheets

(56) References Cited

U.S. PATENT DOCUMENTS

| | | | | |
|---|---|---|---|---|
| 2002/0005249 | A1* | 1/2002 | Kuwako | B32B 15/08 |
| | | | | 156/293 |
| 2002/0074972 | A1* | 6/2002 | Narang | H01M 4/13 |
| | | | | 320/131 |
| 2007/0254214 | A1* | 11/2007 | Horichi | C01G 45/1228 |
| | | | | 429/231.1 |
| 2010/0203387 | A1* | 8/2010 | Yamamoto | H01M 4/13 |
| | | | | 429/220 |

OTHER PUBLICATIONS

English machine translation of JPH06-218691, EPO, accessed Jun. 11, 2019.*

Sawa, Takeshi, "Correlation between Nanoindentation Test Result and Vickers Hardness", IMEKO 2010 TC3, TC5 and TC22 Conferences, Oral Session II TC5, Meterology in Modern Context, Nov. 22-25, 2010, pp. 171-174. (Year: 2010).*

Partial Translation of Relevant Portion of IPC Association Connecting Electronics Industries, IPC-4562A CN, Metal Foil for Printed Board Applications, Aug. 2008, www.ipc.org, Bannockburn, IL.

* cited by examiner

ELECTRODEPOSITED COPPER FOIL WITH ANTI-BURR PROPERTY

FIELD OF THE INVENTION

The present disclosure is directed to a method of making an electrodeposited copper foil having anti-burr properties, as well to an electrodeposited copper foil that exhibits anti-burr properties. The novel electrodeposited copper foil therefore has good clipping properties. Clipping properties is a generic term which encompasses each of slitting, cutting and punching properties, which properties facilitate its use as a current collector in rechargeable lithium ion secondary batteries. Reduction of burrs improves resulting battery construction and density producing higher power generation batteries. Usually, people try to improve the mechanical device used for slitting, cutting or punching electrodeposited copper foil to reduce burr creation. This takes the form of sharper knives or the use of harder materials to reduce the burr formed during slitting, cutting, punching, or otherwise mechanical subdividing electrodeposited copper foil. The present disclosure improves the electrodeposited copper foil itself by adjusting the properties thereof, including at least one of tensile strength, burst strength, surface hardness and elongation.

BACKGROUND

Lithium ion secondary batteries have a combination of high energy and high power density, making it the technology of choice for portable electronic devices, power tools, electric vehicles ("EVs"), energy storage systems ("ESS"), cell phones, tablets, space applications, military applications, and railways. Electric vehicles (EVs), including hybrid electric vehicles ("HEVs"), plug-in hybrid electric vehicles ("PHEVs"), and pure battery electric vehicles ("BEVs"). If electric vehicles(EVs) replace the majority of fossil fuel (e.g., gasoline, diesel fuel, etc.) powered transportation, lithium ion secondary batteries will significantly reduce greenhouse gas emissions. The high energy efficiency of lithium ion secondary batteries may also allow their use in various electric grid applications, including improving the quality of energy harvested from wing, solar, geo-thermal and other renewable sources, thus contributing to their more widespread use in building an energy-sustainable economy.

Therefore, lithium ion secondary batteries are of intense interest from both industry and government funding agencies, and research in this field has abounded in recent years. Although lithium ion secondary batteries are currently in use safety remains a strong concern limiting their application.

These safety issues are enticing battery manufacturers to change the manufacturing process. According to one manufacturer of lithium secondary battery, contamination by metallic particles, such as Cu, Al, Fe and Ni particles, during the manufacturing process may cause an internal short circuit in the battery. A mild short will only cause an elevated self-discharge of the battery. Little heat is generated because the discharging energy is very low. If, however, microscopic metal particles converge on one spot, a major electrical short can develop and a sizable current flow between the anode (negative electrode) and cathode (positive electrode). This causes the temperature to rise, leading to thermal runaway. Although battery manufacturers strive to minimize the presence of metallic particles, complex assembly techniques make the elimination of all metallic dust nearly impossible.

Another safety issue concerning short circuits is even more serious than the presence of metallic particle contamination mentioned above. The creation of burrs during the manufacturing process can cause more serious short circuits in secondary batteries leading to temperature rise and thermal runaway. A large burr projecting above the active-material-containing layer of the anode can break a separator and cause a short circuit between the anode and cathode inside the battery. In addition, the burrs, or the copper particles or powder formed by detaching the burrs from the foil surface during the slitting, cutting or punching process, can attach to the anode surface also creating a short circuit. Burrs attached to the edge part of the anode could break off during battery construction, during consolidation of components of the battery into the battery, or during use of the battery in the charge/discharge cycling, and could also cause similar short circuit trouble. Previously, a cleaning step for removal of the burrs or copper powder used to be required after the cutting of a electrodeposited copper foil with a slitting apparatus. This resulted in complicating the electrode production steps and posing the problem of increase of production cost.

Thus, while electrodeposition of copper onto a rotating cathode drum, which drum is immersed in an electrolyte containing copper under the effect of an electric current, has been used to make electrodeposited copper foils of continuous length, the battery manufacturers subdivide the electrodeposited copper foil into desired sizes. This subdividing of the electrodeposited copper foil can take various forms, such as slitting along the longitudinal length of the electrodeposited copper foil, or cutting transversely across the electrodeposited copper foil, or punching finished shapes into the dimensions required of their battery. This process of cutting, slitting, or even punching the continuous electrodeposited copper foil into the dimensions required in their battery may create burrs along the slit, cut or punched edge.

The process of subdividing the electrodeposited copper foil may cause burrs of different characteristics. There may be many burrs, burrs of relatively long length to width ratios, and burrs of irregular shape.

It is therefore an object of this disclosure to provide an electrodeposited copper foil, where anti-burr formation and burr characteristics are controlled by the properties of the electrodeposited copper foil itself, rather than the slitting, cutting, punching techniques used in subdividing the electrodeposited copper foil. This electrodeposited copper foil is primarily of interest in battery formation, but the copper foil itself has utility as an electrode, a component of capacitors where the electrodeposited copper foil and a second copper foil, which may also be an electrodeposited copper foil, are separated by a dielectric material. Methods of producing the electrodeposited copper foil are also disclosed.

SUMMARY

In one embodiment, this disclosure is directed to an electrodeposited copper foil comprising a specific burst strength in the range of 1.5 to 4.3 kPa*m²/g or 1.5 to 3.5 kPa*m²/g or 1.5 to 3 kPa*m²/g or 1.5 to 2.5 kPa*m²/g. Likewise, the specific burst strength may be in the range of 2.0 to 4.3 kPa*m²/g or 2.0 to 3.5 kPa*m²/g or 2.0 to 3.0 kPa*m²/g. Finally, the specific burst strength may be in the range of 2 to 4 kPa*m²/g or 3.0 to 4.3 kPa*m²/g or 3.5 to 4.3 kPa*m²/g; and, a tensile strength in the range of 30 to 40 kgf/mm² or 30 to 38 kgf/mm² or 30 to 36 kgf/mm² or 30 to 34 kgf/mm² or 30 to 32 kgf/mm². Likewise, the tensile strength may be in the range of 32 to 40 kgf/mm² or 34 to 40 kgf/mm² or 36 to 40 kgf/mm² or 38 to 40 kgf/mm². Finally, the tensile strength may be in the range of 32 to 36 kgf/mm² or 30 to 35 kgf/mm².

In another embodiment, this disclosure relates to an electrodeposited copper foil having a deposited side and a drum side, wherein the deposited side exhibits a hardness in the range of 0.2 to about 2.0 Gpa by nano indentation analysis, a specific burst strength in the range of 1.5 to 4.3 kPa*m²/g; and, a tensile strength in the range of 30 to 40 kgf/mm².

In still a further embodiment, this disclosure is directed to an electrodeposited copper foil comprising a specific burst strength in the range of 1.5 to 4.3 kPa*m²/g; and, a tensile strength in the range of 30 to 40 kgf/mm², which has a clipping edge forming burrs, wherein the number of burrs per 5 cm of slit edge is less than 10.

In a still further embodiment, this disclosure is directed to an electrodeposited copper foil comprising a specific burst strength in the range of 1.5 to 4.3 kPa*m²/g; and, a tensile strength in the range of 30-40 kgf/mm², which has a slit, cut or punched edge forming burrs, wherein if the copper burr is present, the length of the copper burr is in the range of 1 µm to 35 µm, the number of copper burrs per 5 cm of the clipping edge is in the range of 0~9. If the length of the burrs is less than 1 µm, the copper burrs is considered to be absent, that is, burrs less than 1 µm are not recognized to be present.

In yet another embodiment, this disclosure is directed to a process of making an electrodeposited copper foil exhibiting a reduced incidence of copper burrs when subjected to clipping (which, as defined above, encompasses each of a slitting, cutting or punching process), the said reduced copper burrs means the number of burrs in the range of 0~9 per 5 cm by the 500× microscope. The term "clipping edge" is defined as the new edge formed by clipping, that is any one of slitting, cutting or punching the copper foil to form a new edge. The process including the steps of electrodepositing a copper foil onto a cathode from an electrolytic solution comprising copper, sulfuric acid, chloride and a polyetheramine of general formula:

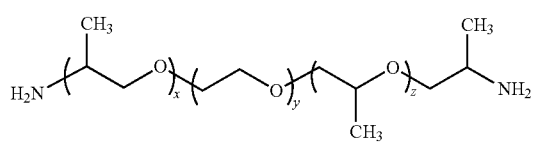

wherein the polyetheramine is present in an amount of 3.5 to 5.5 ppm based on the total weight of the electrolytic solution; and (x+z) is in the range of 2~7 and y is in the range of 1~9. In some embodiments, (x+z) is from 2.1 to 5, or from 2.5 to 6.5, or from 3 to 6.5, or from 3.5 to 5, or from 6.5 to 7. In some embodiments, y is from 1.5 to 9, or from 2 to 8, or from 2.5 to 8.5, or from 3 to 7.5, or from 3.5 to 7, or from 4 to 6.5, or from 4.5 to 6, or from 5 to 9.

In a still further embodiment, the disclosure relates to a rechargeable secondary lithium-ion battery containing an electrodeposited copper foil as described above as a component thereof. The electrodeposited copper foil may be coated with anode active component and further be used as a current collector of a lithium ion secondary battery. A current collector for a lithium ion secondary rechargeable battery comprising a reduced copper burr property on a clipping edge of the electrodeposited copper foil, wherein the reduced copper burr property is defined as the number of copper burrs per 5 cm of the clipping edge is in the range of 0~9, and a specific burst strength in the range of 1.5 to 4.3 kPa*m2/g; and a tensile strength in the range of 30 to 40 kgf/mm2. A lithium ion secondary rechargeable battery comprising the current collector described above exhibits a charge/discharge cycle life of more than 1000 times. The active anode component may be a slurry which is deposited on the matte or deposited side of the electrodeposited copper foil and subsequently pressed between rollers. The pressure of the rollers is necessary to consolidate the anode active material with the deposited side of the electrodeposited copper foil, but the step of pressing may create wrinkles in the electrodeposited copper foil, which wrinkles are deleterious to long charge/discharge cycle life of a lithium ion secondary battery in which the electrodeposited copper foil is a component. Thus, there is a long felt need to provide an electrodeposited copper foil that will not wrinkle during a pressing step to consolidate anode active material on the matte or deposited side of the electrodeposited copper foil.

In a still further embodiment, the disclosure relates to a capacitor comprising an electrodeposited copper foil, the electrodeposited copper foil exhibiting a reduced incidence of copper burrs when subjected to clipping, the electrodeposited copper foil comprising: a specific burst strength in the range of 1.5 to 4.3 kPa*m2/g; and, a tensile strength in the range of 30 to 40 kgf/mm2; an elongation in the range of 5.1 to 21.4%; the capacitor further comprising at least a second copper foil; wherein the electrodeposited copper foil and the second copper foil are separated by a dielectric layer. a capacitor containing an electrodeposited copper foil as described above as a component thereof. A capacitor comprising an electrodeposited copper foil, the electrodeposited copper foil comprising: a specific burst strength in the range of 1.5 to 4.3 kPa*m2/g; and, a tensile strength in the range of 30 to 40 kgf/mm2; an elongation in the range of 5.1 to 21.4%; the capacitor further comprising at least a second copper foil; wherein the electrodeposited copper foil and the second copper foil are separated by a dielectric layer.

These and other embodiments will be further described in conjunction with the appended drawings and the following detailed description and examples.

DETAILED DESCRIPTION OF THE EMBODIMENTS

Figure 1:
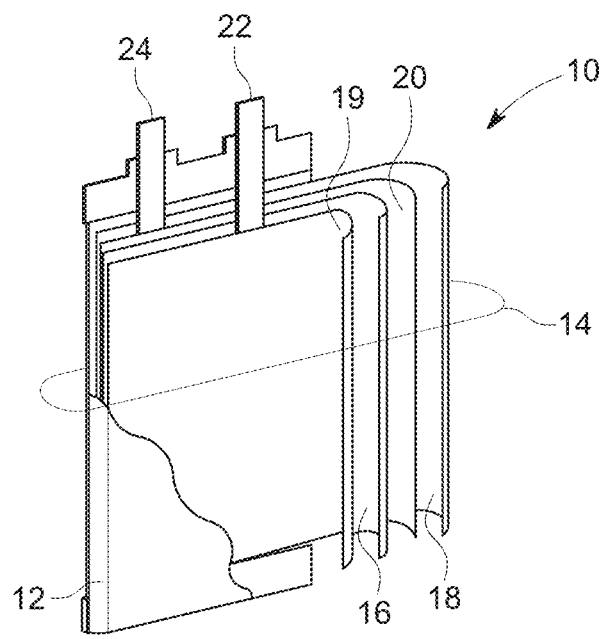
FIG. 1 is schematic illustration, partially in cross-section, of a typical lithium-ion battery structure.

The present invention is described with reference to the attached figures, wherein like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1 schematically illustrates, in partial cross-section, a typical lithium-ion secondary battery 10. The structure of lithium-ion secondary battery 10 includes a pouch 12 which surrounds a "jelly-roll" composite 14 comprising alternating layers of negative electrode 16 and positive electrode 18 separated by a series of separators 19, 20. A negative tab 22 can be affixed to the negative electrode 16. A positive tab 24 can be attached to positive electrode 18. The purpose of tabs 22 and 24 is to attach the lithium-ion secondary battery 10 to external components running on battery power, such as electric motors, electronic circuits, electric vehicles (EVs) or other components. It is important for the various layers of negative electrode 16 and positive electrode 18 to remain electrically isolated from one another and not to have the separators 19, 20 punctured by burrs on the edges of negative electrode 16. Nor is it desirable that the presence of burrs hinder the desired consolidation of the various alternating layers and separators. Because the present invention exhibits a reduced incidence of copper burrs, the layers can be pressed tightly together, thus forming a high density and high power generation secondary battery utilizing a good electrodeposited copper foil with good cutting or stamping properties and a good performance of charge-discharge cycle life in the resulting secondary battery. Decreasing the internal volume of the components within a battery case results in a power generation element within the battery case of high density and improves the energy density. A laminated rechargeable secondary lithium ion battery may also be formed by alternating stacked layers of an anode active material deposited on an electrodeposited copper foil as described herein and a cathode active material deposited on another metal foil, such as aluminum, the alternating anode and cathode layers being interleaved with an insulating separator layer. For example, an anode may be formed by deposited an anode active material on the deposited side of an electrodeposited copper foil, and consolidating the anode active material with the electrodeposited copper foil by passing both the foil with the anode active substance thereon through the nip of opposing rollers of a roller press. The electrodeposited copper foil may be subdivided from a larger foil by slitting/cutting/punching the larger foil into the desired size for the anode layer of the battery. Acceptable insulators for the separator can be a microporous thin film, woven or non-woven fabric. Suitable materials for the separator include polyolefins, such as polyethylene and polypropylene. The alternating layers and separators can be tightly compacted together and covered by a non-metallic or metallic case. An electrolyte can be introduced into the case before sealing of the case to form a high density energy source capable of more than 1000 charge/discharge cycles. The electrolyte is non-aqueous, but may be in the form of a liquid, gel, or solid non-aqueous electrolyte, which includes an electrolytic salt (e.g., a lithium salt) and a non-aqueous solvent for dissolving the electrolytic salt.

Figure 2A:
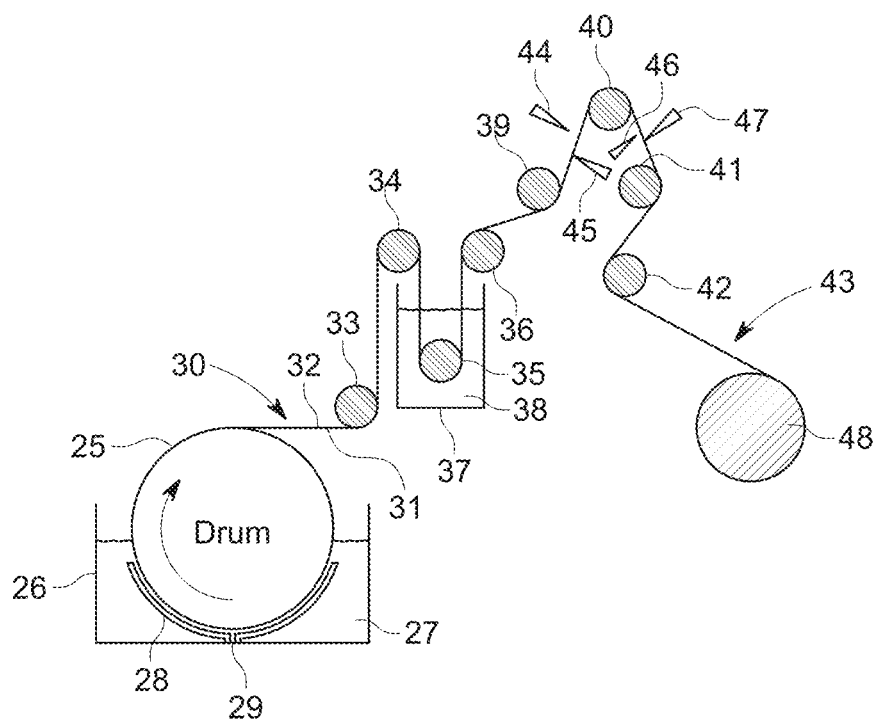
FIG. 2A is a schematic representation of a process of making an electrodeposited copper foil.

FIG. 2A is a schematic representation of a typical electrodeposition apparatus and process for making electrodeposited copper foil from a copper sulfate electrolyte solution containing copper ions. A rotating drum 25 is partially immersed in a tank 26 containing an electrolyte solution 27. Electrolyte solution 27 typically contains sulfuric acid into which high purity copper, in the form of chopped wire, has been dissolved. In this disclosure, for every liter of copper sulfate electrolyte can be added 3 mg/kg of sodium 3-mercaptopropane sulfonate (MPS, manufactured by Hopax Chemicals Manufacturing Company, Ltd.) 25 ppm (Cl-) of hydrochloric acid (manufactured by RCI Labscan Ltd.), 5 mg/kg of Maltodextrin (manufactured by San Soon Seng ltd.) and 3.5 to 5.5 mg/kg of polyetheramine having the following formula (I):

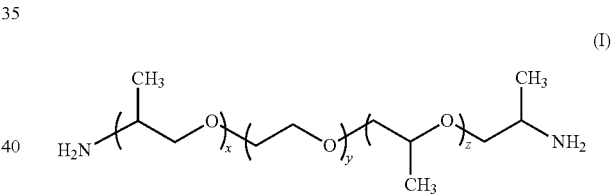

where (x+z) is in the range of 2~7 and y is in the range of 1~9. We have utilized commercially available polyetheramines (ED-900 or ED-2003) with great success. In this invention, polyetheramine which has an (x+z) average value of about 3.6 to about 6 and a y average value of about 9 to about 39. It has an average molecular weight (MW) of about 600 to 2000. Drum 25 acts as a cathode and an insoluble metal anode 28 is in contact with electrolyte solution 27. The electrolyte can be continuously replenished by pumping the electrolyte 27 through port 29. Under the influence of a direct current ("DC") applied between anode 28 and drum 25 at a current density of 50 A/dm$^2$ at a temperature of 45° C. to 55° C., a continuous raw electrodeposited copper foil 30 is deposited until it reaches about 8 µm, at which time the raw electrodeposited copper foil 30 is stripped from drum 25. Those skilled in the art use the term "drum side" (or S- or shiny side) 31 to denote the side of the electrodeposited copper foil formed directly against the surface of drum 25. As the surface of drum 25 can be regulated by polishing, its surface qualities, such as surface roughness (Rz) are imparted to drum side 31 of raw electrodeposited copper foil 30. The surface of drum 25 can be given a mirror finish. On the other hand, the opposite side of the raw electrodeposited copper foil 30 has a "deposited side" (sometimes also called in the art, the M-side or matte side) 32, the surface roughness of which is regulated by the process of deposition of copper from the electrolyte 27. A series of guide rollers 33, 34, 35, 36 convey the raw electrodeposited copper foil 30 though a second tank 37 which contains an anti-tarnish solution 38. The anti-tarnish solution 38 coats both the drum side 31 and the deposited side 32 of raw electrodeposited copper foil 30 to prevent tarnishing of these electrodeposited copper foil surfaces. A further series of conveying rollers 39, 40, 41, 42 draws the surface treated copper foil 43 through a series of air knives 44, 45, 46, 47, which dries anti-tarnish solution on the surface treated copper foil 43. The surface treated copper foil 43 can be wound upon a mother roll 48 to be stored or transported for further processing.

Figure 2B:
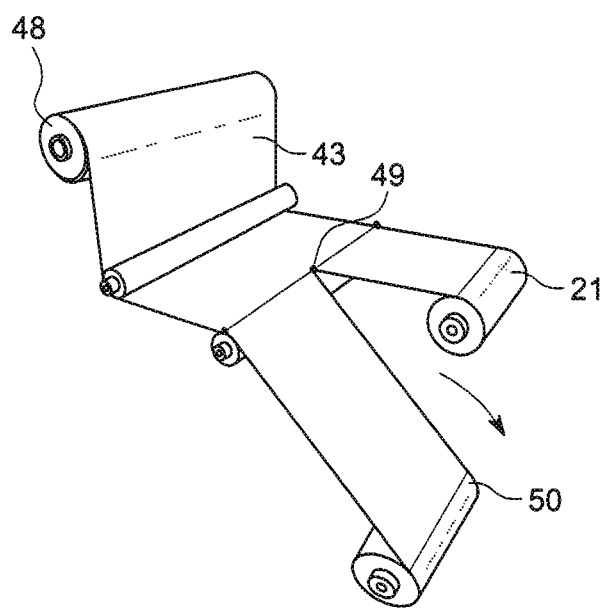
FIG. 2B is a schematic diagram of subdividing the electrodeposited copper foil made in FIG. 2A, by slitting it along its longitudinal direction (or running) length.

As shown in FIG. 2B, the surface treated copper foil 43 is unwound from mother roll 48 and subjected to subdividing by slitting the surface treated copper foil in its longitudinal direction at 49 to form a roll product 50 and selvage 21. For all purposes herein, the "clipping edge" is any edge on the copper foil formed by slitting, cutting, pinching or other process which reduces the original size of the copper foil.

Figure 2C:
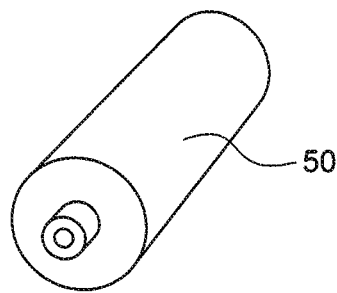
FIG. 2C is a schematic illustration of the rolled copper foil produced in the slitting illustrated in FIG. 2B.

As shown in FIG. 2C, roll product 50 can be directly utilized by a battery manufacturer to form lithium-ion secondary batteries of the jelly-roll type, or could be further subdivided by cutting transverse to the longitudinal direction to form a component of a stacked lithium ion battery.

Figure 3:
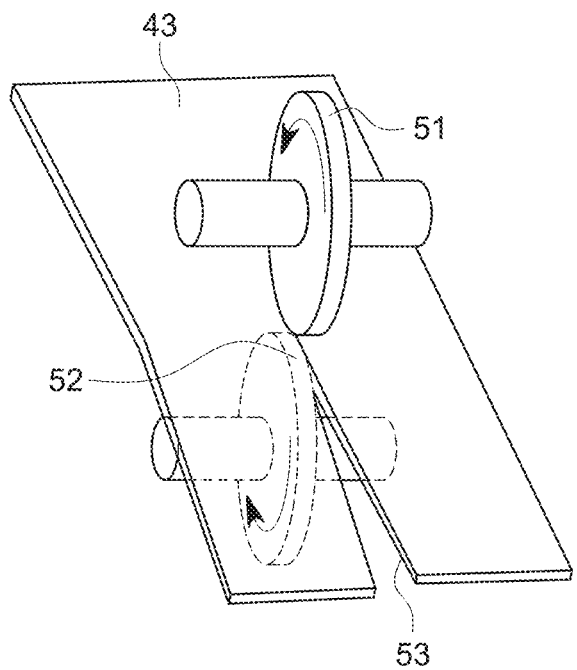
FIG. 3 is a schematic illustration of an upper and a lower knife used in a typical slitting process.

FIG. 3 is a schematic illustration of an actual slitting process, where the surface treated copper foil 43 passes between an upper knife 51 and a lower knife 52 to form a new edge 53 on the copper foil. New edge 53 is the clipping edge, or the edge formed by clipping the copper foil 43.

Figure 4:
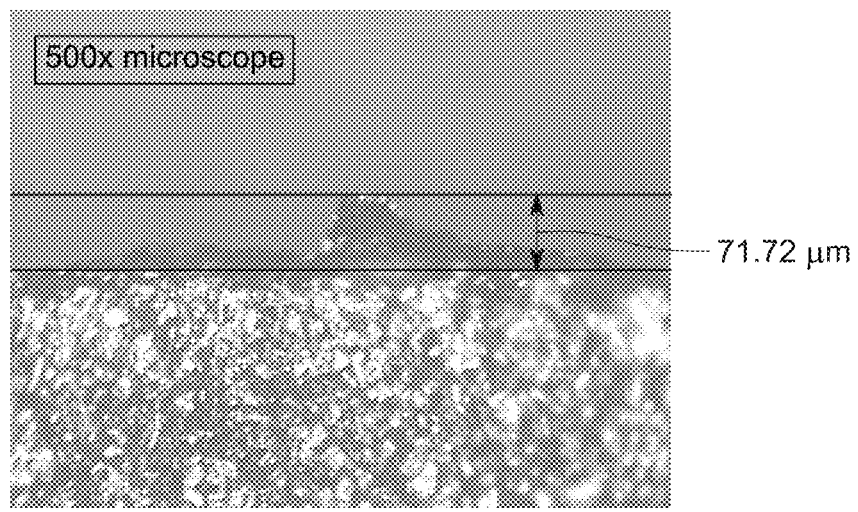
FIG. 4 is a microphotograph from the top view of a slit electrodeposited copper foil edge magnified 500 times to visually illustrate an actual burr on the edge of the slit electrodeposited copper foil.

FIG. 4 is a photomicrograph at a magnification of 500 times illustrating a copper burr 54 on clipping edge 53 of surface treated copper foil 43.

Figure 5:
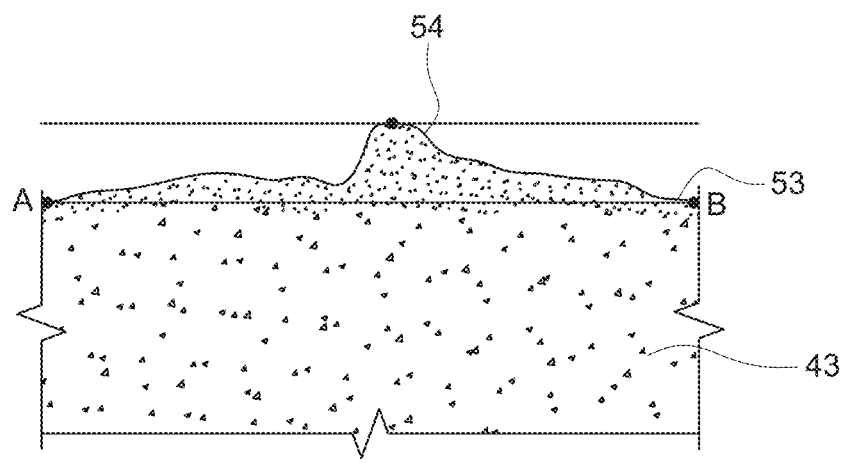
FIG. 5 is a line drawing of the photomicrograph of FIG. 4 as an example of measuring a single burr in accordance with the advanced definition of burrs as used in this disclosure.
Figure 8A:
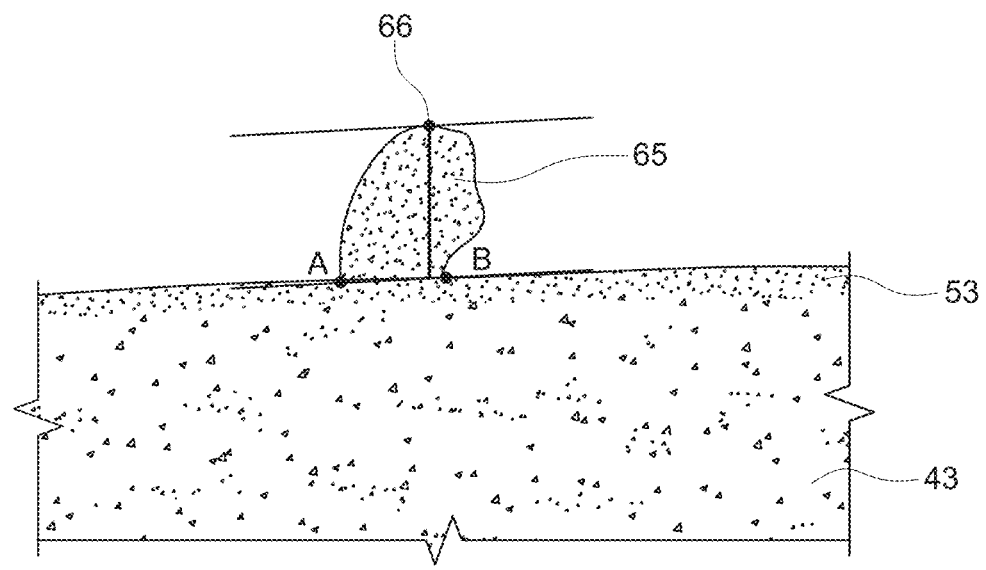
FIGS. 8A-8D are illustrations of burrs utilizing an advanced definition of a burr as used in this disclosure.

FIG. 5 is a line drawing rendition of FIG. 4 to illustrate the clipping edge 53 on a surface treated copper foil 43 in order to explain the definition of burr as utilized throughout the specification and claims. A sample of an irregular burr can be seen clearly in line drawing depiction of the 500× microscopic photograph of FIG. 4. In FIG. 5, points A and B are clearly marked in FIG. 5 in accordance with the advanced definition of a burr as set forth in connection with FIG. 8A. The tip is also marked. In this particular case, a single burr encompasses a length of 71.72 μm between tip line and base line.

Figure 6:
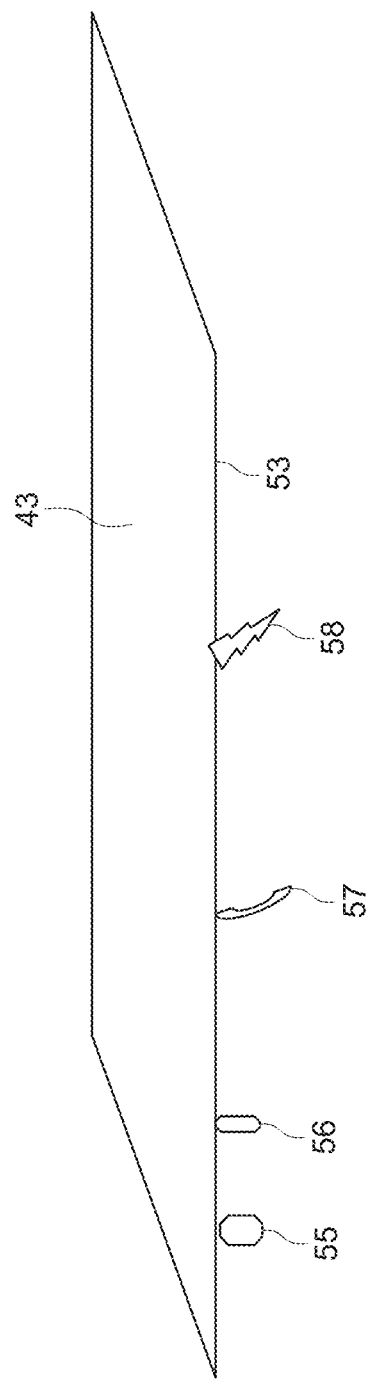
FIG. 6 is a schematic representation of various shaped burrs that can be formed on a slit or cut edge of an electrodeposited copper foil.

FIG. 6 is a schematic representation of various shaped burrs 55, 56, 57, 58 that can be formed on a clipping edge 53 of a surface treated electrodeposited copper foil 43.

Figure 7:
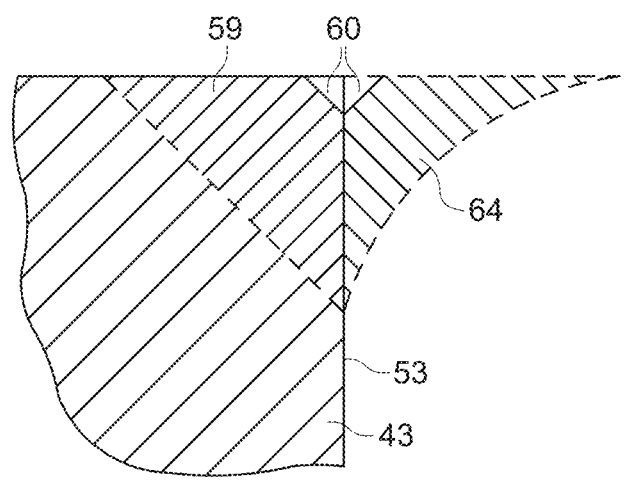
FIG. 7 is an illustration used in the ISO 13715: 2017 definition of a burr.

FIG. 7 is an illustration used in the ISO 13715: 2017 definition of a burr 64, where 43 represents the surface treated copper foil and 53 represents the clipping edge. The ISO 13715: 2017 definition identifies the size of an undercut at 59 and the size of the sharp edge at 60. As these theoretical shapes seldom appear in actual visually inspected samples, in order to specifically describe how burrs look like and how many burrs remain on the edge, the present inventors adopt a different definition of a burr.

Figure 8B:
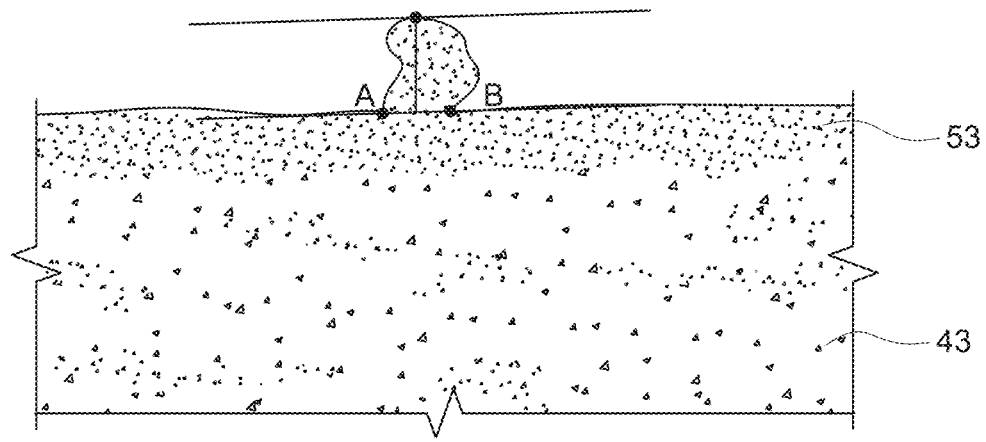
Figure 8C:
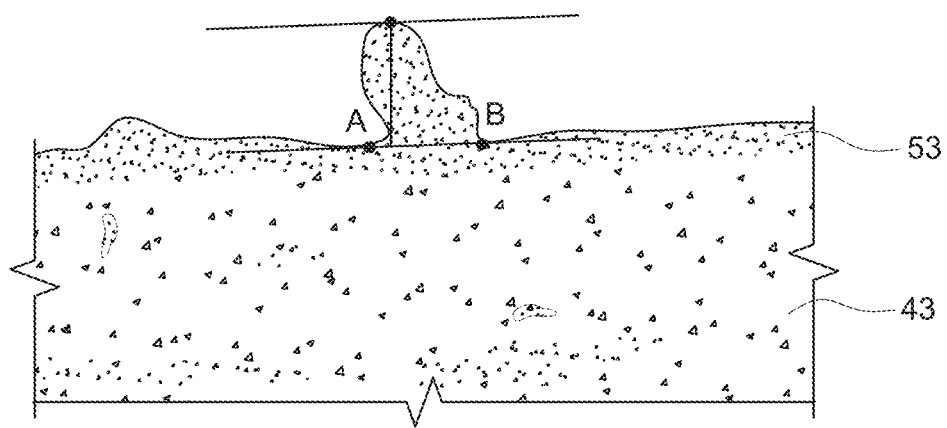
Figure 8D:
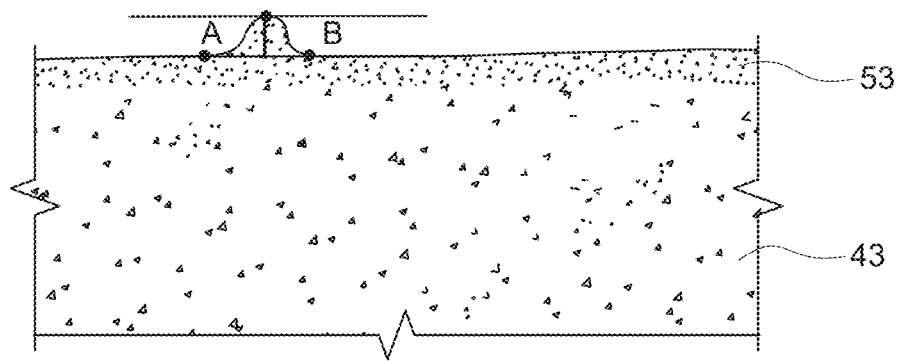

The present application uses an advanced definition of a burr as illustrated in FIGS. 8A-8D. The advanced definition of the burr in this specification begins with the definition of the joint point which, starting from the tip point of copper burr, in a first direction, the first joint point between the root of the burr 65 and the clipping edge 53 of surface treated electrodeposited copper foil 43 is defined as point A. Following the same principle, joint point B could be defined by going in the other direction from the first direction. The baseline of the burr 65 is found by connecting point A with point B. The tip line 66 of the burr is a line, parallel to the base line which runs through the tip of the burr 65. As shown in FIGS. 8B-8D, the tip line 66 may or may not be parallel to the clipping edge 53.

Figure 9:
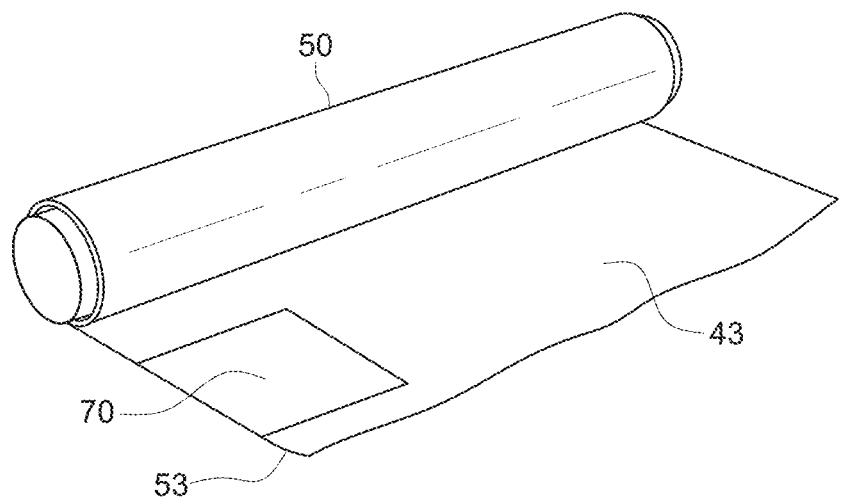
FIG. 9 is a schematic illustration of a test method for measuring burrs formed on a slit edge of an electrodeposited copper foil.

FIG. 9 is a schematic illustration of a test method for measuring burrs formed on a slit edge of an electrodeposited copper foil. As shown in FIG. 9, a 5 cm by 5 cm sample 70 is taken from a surface treated copper foil 43. At 500X microscope inspection, the burrs, if any, along the slit edge will be visible. No matter how irregular the shape of burr is, we only recognize copper burrs whose length is in the range of 1 μm~35 μm per 5 cm length copper foil. Also recorded is the length of the burr by measuring the distance between the tip line and baseline as discussed in connection with FIG. 8A. No matter how irregular the shape of the burr between point A and point B, only record one burr number. Count the total amount of burrs along the 5 cm length.

Figure 10:
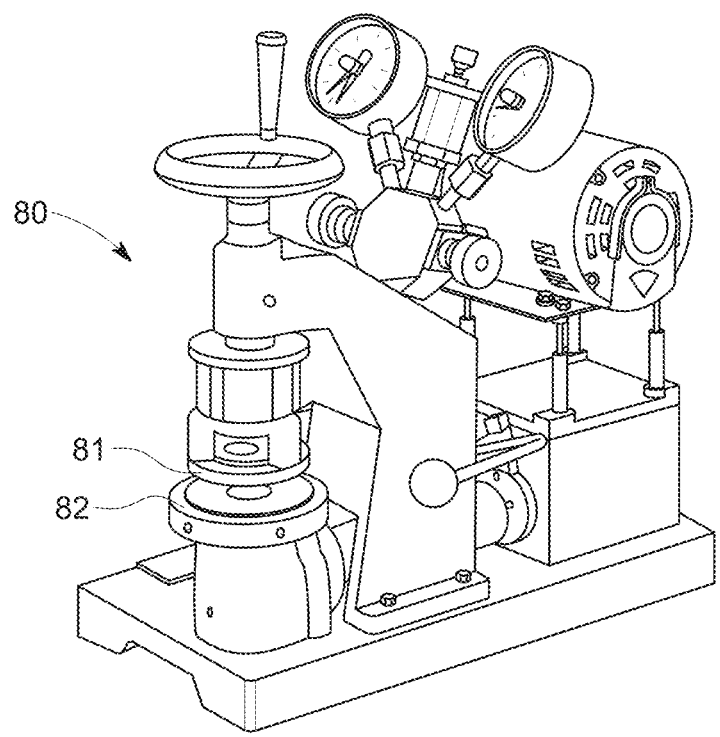
FIG. 10 is a schematic illustration of a test apparatus for measuring burst strength of a electrodeposited copper foil.

FIG. 10 is a schematic illustration of a test apparatus 80 for measuring burst strength of an electrodeposited copper foil. A sample of electrodeposited copper foil (omitted for clarity) is placed between a clamping ring and a diaphragm 82, with the deposited side of the electrodeposited copper foil facing upwards towards the clamping ring 81. After lowering clamping ring 81 against the electrodeposited copper foil and applying sufficient pressure to prevent slipping of the electrodeposited copper foil between the clamping ring and diaphragm, bursting strength is determined by measuring the maximum pressure when the electrodeposited copper foil sample breaks by using Model GS-7611 bursting strength testing machine of GS-QC-Tester Instrument Enterprise Co., Ltd. Specific bursting strength units are kPa·m$^2$/g=bursting strength (kPa)/area weight (g/m$^2$).

We have found that modifying the electrolyte solution with additives has an effect on at least one of the number of burrs, the length of burrs or both. When we utilized a polyetheramine of formula (I):

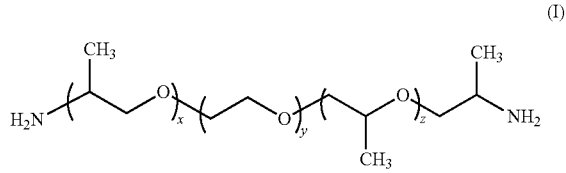

(I)

The length of the burr changed with the number of repeating units (x+z), a different (x+z) may change the burst strength, and a specific burst strength leads to a different length of burr. On the other hand, changing the concentration and number of repeating units, y, changes the number of burrs, with the different concentration of repeating units, y, may change the tensile strength and different tensile strengths leads to different amounts of burrs. We generally have found that the relationship falling with the (x+z) is in the range of 2~7 and y is in the range of 1~9 produces the best results. While other components were added to the electrolyte solution, in both the Examples and comparative Examples which follow, we maintained these other components essentially the same such that the effect of the polyetheramine was the one of the variables in the composition which achieved different results.

EXAMPLES AND COMPARATIVE EXAMPLES

Table 1 below is indicative of the compositions utilized in Examples 1-11 and Comparative Examples 1-17. Table 2 is indicative of the properties of the electrodeposited copper foils resulting from the compositions of Examples 1-11 and Comparative Examples 1-17 of Table 1.

Test Methods

The following are the Test methods used to measure tensile Strength, Elongation and Area Weight.

TABLE 1

|  | Thickness (um) | Area weight (g/m2) | Current density (ASD) | Temperature (° C.) | Cu (g/l) | H2SO4 (g/l) | CI (ppm) | MPS (ppm) | maltodextrin (ppm) | Polyetheramine (ppm) x + z | y |
|---|---|---|---|---|---|---|---|---|---|---|---|
| Example 1 | 8 | 72.3 | 50 | 45 | 80 | 110 | 25 | 3 | 5 | 5.5 | 2 | 1 |
| Example 2 | 5 | 45.4 | 50 | 45 | 80 | 110 | 25 | 3 | 5 | 5.5 | 2 | 1 |
| Example 3 | 8 | 72.4 | 50 | 48 | 80 | 110 | 25 | 3 | 5 | 5.5 | 7 | 1 |
| Example 4 | 8 | 72.6 | 50 | 48 | 80 | 110 | 25 | 3 | 5 | 5.5 | 2 | 9 |
| Example 5 | 10 | 89.5 | 50 | 48 | 80 | 110 | 25 | 3 | 5 | 5.5 | 2 | 9 |
| Example 6 | 8 | 72.4 | 50 | 51 | 80 | 110 | 25 | 3 | 5 | 5.5 | 7 | 9 |
| Example 7 | 8 | 72.5 | 50 | 51 | 80 | 110 | 25 | 3 | 5 | 3.5 | 2 | 1 |
| Example 8 | 8 | 72.3 | 50 | 51 | 80 | 110 | 25 | 3 | 5 | 3.5 | 7 | 1 |
| Example 9 | 8 | 72.4 | 50 | 55 | 80 | 110 | 25 | 3 | 5 | 3.5 | 2 | 9 |
| Example 10 | 8 | 72.7 | 50 | 55 | 80 | 110 | 25 | 3 | 5 | 3.5 | 7 | 9 |
| Example 11 | 20 | 185.4 | 50 | 55 | 80 | 110 | 25 | 3 | 5 | 3.5 | 2 | 9 |
| Comp. 1 | 5 | 45.5 | 50 | 45 | 80 | 110 | 25 | 3 | 5 | 5.5 | 1 | 1 |
| Comp. 2 | 8 | 72.3 | 50 | 45 | 80 | 110 | 25 | 3 | 5 | 5.5 | 1 | 1 |
| Comp. 3 | 8 | 72.5 | 50 | 45 | 80 | 110 | 25 | 3 | 5 | 5.5 | 2 | 0 |
| Comp. 4 | 8 | 72.3 | 50 | 48 | 80 | 110 | 25 | 3 | 5 | 5.5 | 8 | 9 |
| Comp. 5 | 10 | 89.6 | 50 | 48 | 80 | 110 | 25 | 3 | 5 | 5.5 | 8 | 9 |
| Comp. 6 | 8 | 72.7 | 50 | 48 | 80 | 110 | 25 | 3 | 5 | 5.5 | 7 | 10 |
| Comp. 7 | 8 | 72.5 | 50 | 51 | 80 | 110 | 25 | 3 | 5 | 3.5 | 1 | 1 |
| Comp. 8 | 8 | 72.7 | 50 | 51 | 80 | 110 | 25 | 3 | 5 | 3.5 | 7 | 10 |
| Comp. 9 | 8 | 72.4 | 50 | 51 | 80 | 110 | 25 | 3 | 5 | 6.5 | 2 | 1 |
| Comp. 10 | 8 | 72.7 | 50 | 55 | 80 | 110 | 25 | 3 | 5 | 2.5 | 2 | 1 |
| Comp. 11 | 8 | 72.8 | 50 | 51 | 80 | 110 | 25 | 3 | 5 | 6.5 | 7 | 9 |
| Comp. 12 | 8 | 72.5 | 50 | 55 | 80 | 110 | 25 | 3 | 5 | 2.5 | 7 | 9 |
| Comp. 13 | 20 | 185.6 | 50 | 55 | 80 | 110 | 25 | 3 | 5 | 6.5 | 7 | 9 |
| Comp. 14 | 20 | 185.8 | 50 | 55 | 80 | 110 | 25 | 3 | 5 | 3.5 | 1 | 1 |
| Comp. 15 | 8 | 72.2 | 50 | 40 | 80 | 110 | 25 | 3 | 5 | 5.5 | 2 | 1 |
| Comp. 16 | 10 | 89.6 | 50 | 40 | 80 | 110 | 25 | 3 | 5 | 5.5 | 2 | 9 |
| Comp. 17 | 20 | 185.3 | 50 | 60 | 80 | 110 | 25 | 3 | 5 | 3.5 | 2 | 9 |

TABLE 2

|  | Tensile strength (kgf/mm2) | Elongation (%) | burst strength (kPa) | Specific burst strength (kPa*m2/g) | Deposited side Nano indentation hardness (GPa) | Length of copper burr (um) | Numbers of Copper burr (No./5 cm) | wrinkle | charge/discharge cycle life |
|---|---|---|---|---|---|---|---|---|---|
| Example 1 | 37.3 | 6.6 | 117.68 | 1.6 | 2.0 | 7 | 5 | X | ○ |
| Example 2 | 36.3 | 5.8 | 78.45 | 1.7 | 2.0 | 1 | 5 | X | ○ |
| Example 3 | 37.9 | 6.1 | 264.78 | 3.7 | 1.5 | 31 | 7 | X | ○ |
| Example 4 | 39.5 | 5.8 | 107.87 | 1.5 | 1.5 | 3 | 1 | X | ○ |
| Example 5 | 39.7 | 16.8 | 323.62 | 3.6 | 1.5 | 28 | 1 | X | ○ |
| Example 6 | 39.8 | 5.1 | 245.17 | 3.4 | 0.9 | 23 | 1 | X | ○ |
| Example 7 | 30.2 | 10.5 | 107.87 | 1.5 | 0.9 | 5 | 9 | X | ○ |
| Example 8 | 31.3 | 9.5 | 254.98 | 3.5 | 0.9 | 28 | 8 | X | ○ |
| Example 9 | 32.5 | 8.4 | 117.68 | 1.6 | 0.2 | 8 | 6 | X | ○ |
| Example 10 | 33.3 | 7.3 | 264.78 | 3.6 | 0.2 | 31 | 6 | X | ○ |
| Example 11 | 32.9 | 21.4 | 794.35 | 4.3 | 0.2 | 35 | 6 | X | ○ |
| Comp. 1 | 36.2 | 5.6 | 58.84 | 1.3 | 2.0 | 42 | 5 | X | X |
| Comp. 2 | 37.2 | 6.6 | 88.26 | 1.2 | 2.0 | 40 | 6 | X | X |
| Comp. 3 | 27.5 | 6.4 | 117.68 | 1.6 | 2.0 | 8 | 15 | X | X |
| Comp. 4 | 39.1 | 5.2 | 343.24 | 4.7 | 1.5 | 45 | 2 | X | X |
| Comp. 5 | 39.3 | 17.1 | 500.15 | 5.6 | 1.5 | 55 | 2 | X | X |
| Comp. 6 | 41.2 | 5.3 | 264.78 | 3.6 | 1.5 | 30 | 20 | X | X |
| Comp. 7 | 31.1 | 9.4 | 88.26 | 1.2 | 0.9 | 43 | 7 | X | X |
| Comp. 8 | 29.5 | 9.1 | 254.98 | 3.5 | 0.9 | 32 | 18 | X | X |
| Comp. 9 | 42.3 | 4.8 | 117.68 | 1.6 | 0.9 | 10 | 21 | X | X |
| Comp. 10 | 28.5 | 10.8 | 127.49 | 1.8 | 0.2 | 13 | 17 | X | X |
| Comp. 11 | 43.4 | 4.5 | 264.78 | 3.6 | 0.9 | 31 | 29 | X | X |
| Comp. 12 | 29.2 | 10.5 | 264.78 | 3.7 | 0.2 | 29 | 16 | X | X |
| Comp. 13 | 42.9 | 18.9 | 833.58 | 4.5 | 0.2 | 39 | 31 | X | X |
| Comp. 14 | 31.5 | 25.3 | 245.17 | 1.3 | 0.2 | 44 | 6 | X | X |
| Comp. 15 | 37.2 | 6.5 | 117.68 | 1.6 | 2.5 | 6 | 4 | ○ | N/A |
| Comp. 16 | 39.6 | 16.4 | 333.43 | 3.7 | 2.6 | 30 | 1 | ○ | N/A |
| Comp. 17 | 32.8 | 21 | 774.74 | 4.2 | 0.05 | 34 | 5 | ○ | N/A |

Tensile Strength—Based on the method of IPC-TM-650, the electrodeposited copper foil was cut to obtain a test sample with the size of 100 mm×12.7 mm (length×width), and the test sample was measured at room temperature (about 25° C.) under the conditions of a chuck distance of 50 mm and a crosshead speed of 50 mm/min by using Model AG-I testing machine of Shimadzu Corporation.

Elongation—Based on the method of IPC-TM-650, the electrodeposited copper foil was cut to obtain a test sample with the size of 100 mm×12.7 mm (length×width), and the test sample was measured at room temperature (about 25° C.) under the conditions of a chuck distance of 50 mm and a crosshead speed of 50 mm/min. by using Model AG-I testing machine of Shimadzu Corporation. The elongation in electrodeposited copper in the range of 5.1 to 21.4%;

Area Weight—Based on the method of IPC-TM-650, A test piece with a size of 100 mm in length×100 mm in width was tailored from each of the electrodeposited copper foils, and an AG-204 type microbalance manufactured by Mettler Toledo International Inc. was used to measure the test piece. For each of the test pieces, the numerical value in the reading taken was multiplied by 100 to obtain an area weight $(g/m^2)$.

Specific bursting strength—Based on the method of IPC-TM-650 2.4.2, the electrodeposited copper foil was cut to obtain a test sample with the size of 100 mm×100 mm (length×width), then place a sample of the copper foil to be tested over the diaphragm with the deposit side up. Lower the clamping ring, applying sufficient pressure to prevent slippage of the sample between the plates. Bursting strength is determined by measuring the maximum pressure when the copper foil sample breaks by using Model GS-7611 bursting strength testing machine of GS-QC-Tester Instrument Enterprise Co., Ltd.

$$\text{Specific bursting strength}(kPa \cdot m2/g) = \text{bursting strength}(kPa)/\text{area weight}(g/m2)$$

Nano indentation hardness—A test piece with a size of 100 mm in length×100 mm in width was analyzed by an indenter system (MTS nano indenter XPW system, model XPW291) using Berkovich indenter with curvature radius ≤50 nm. The indentation speed is 0.04 mm/s. Due to irregularity of surface profile, the initial measurement value of hardness tended to be higher. As the indentation depth increased, the value of hardness became stable. Therefore, indentation hardness at 300 nm indentation depth was recorded.

Measurement of Burr—Along with the clipping edge 53 (indicated in FIG. 3 and FIG. 9) of copper foil, take a sample piece of 5 cm×5 cm. Check the burrs at 5 cm clipping edge under 500X microscope. First a joint point needs to be defined by the following principle: Starting from the tip point of copper burr, to one direction, the joint point between the root of burr and the edge of copper foil is defined at point A and point B. Connect point A and B to form a baseline. At the tip of the burr, set a parallel line (tip line) to the baseline. The length of the copper burr is perpendicular to two parallel lines (baseline and tip line). To avoid miscounting small convex areas as burrs, only length of copper burrs over 1 μm can be considered burrs.

Analysis and Discussion of Examples and Comparative Examples

Tensile Strength: Examples 2, 7: When the concentration (in ppm) of polyetheramine increases, the tensile strength increases. Comparative Examples 9 and 10: When the concentration of polyetheramine is too high or too low, the tensile strength is outside the range of 30 to 40 $kgf/mm^2$. Examples 3, 6: When the y value in the polyetheramine increases, the tensile strength increases. Comparative Example 6: When the y value is too high, the tensile strength is outside the range of 30 to 40 $kgf/mm^2$.

Bursting Strength: Examples 2,3: When the (x+z) value of polyetheramine increases, the burst strength increases. Comparative Example 2: When the (x+z) value is too low, the burst strength is too low. Examples 1, 2, 5 and 11: When the thickness of the electrodeposited copper foil is thicker, the burst strength is stronger.

Quantity of copper burrs: When the tensile strength increases, the number of copper burrs decreases. When the tensile strength is too high or too low (>40 or <30), the amount of copper burrs will be too great. While not wishing to be bound to a theory, we observed the greater the tensile strength, the less copper burrs were observed.

Size of copper burrs: When the burst strength increases, the copper burrs increase in size. While not wishing to be bound to a theory, we observed that the smaller the specific burst strength, the smaller the size of copper burrs. When the burst strength is too high or too low, the copper burrs will be too large.

Number of burrs: No matter how irregular the shape of burr is, we only record those whose length is in the range of 10 μm~35 μm per 5 cm length copper foil.

Comparative Example 6: When the tensile strength exceeds the upper limit (40 $kgf/mm^2$), and comparative Example 12: When the tensile strength decreases below 30 $kgf/mm^2$, the number of burrs increases.

Length of burrs: The length of the copper burr is perpendicular to two parallel lines (base line and tip line). To avoid miscounting small convex area as burrs, only length of copper burrs is over 10 μm can be considered burrs. Example 2: When the specific burst strength (kPa·) is low, the length of burr (in μm) decreases. Example 11: When the specific burst strength is high, the length of burr increases. The specific burst strength in the range of 1.5 to 4.3 kPa*m2/g has good performance of charge/discharge cycle life.

Deposited Side nano indentation hardness: Comparative example 17: When the temperature of electrolyte reaches 60° C., the surface nano indentation hardness (GPa) of the deposited side is below 0.2 GPa. Due to very soft surface, during pressing negative active material by rollers, lots of wrinkles appear in the electrodeposited copper foil. This kind of electrode cannot be subjected to next assembling step. Comparative Examples 15 and 16 show that when the temperature of electrolyte is below 60° C., the surface nano indentation hardness (GPa) of the deposited side is above the upper limitation 2 GPa. Because the surface is too stiff, there is not enough cushion between the surface of the copper foil and the pressing rollers. Lots of wrinkles appear as well. The electrodeposited copper foil described by Comparative example 15, 16 and 17 are not acceptable.

Charge-Discharge Cycle Test of Lithium Ion Secondary Rechargeable Battery Made with Electrodeposited Copper Foil of the Disclosure A Laminated Type Lithium Ion Secondary Battery was prepared as follows and subjected to a high c-rate charging and discharging test. N-methyl-2-pyrolidone ("NMP") was used as a solvent for a cathode material (at a solid to liquid ratio of 195 wt. % (100 g of the cathode material: 195 g of NMP)) as shown in Table 3 below, so as to obtain a cathode slurry. NMP was used as a solvent for an anode material (at a solid to liquid ratio of 60 wt. % (100 g of the anode material: 60 g of NMP)), so as to obtain an anode slurry.

TABLE 3

| Cathode material formulation: Based on the total weight of the cathode material | |
| --- | --- |
| Cathode active substance (LiCoO$_2$) | 89 wt % |
| Conductive additive (Flaked graphite; KS6) | 5 wt % |
| Conductive additive (Conductive carbon powder; Super P ®) | 1 wt % |
| Solvent-Based Binder (PVDF1300) | 5 wt % |
| Anode material formulation: Based on the total weight of the anode material | |
| Anode active substance (MGPA) | 93.9 wt % |
| Conductive additive (Conductive carbon powder; Super P ®) | 1 wt % |
| Solvent-Based Binder (PVDF6020) | 5 wt % |
| Oxalic acid | 0.1% |

Charge-Discharge Cycle Test (To 80% of Initial Capacity)

Then, the cathode slurry was coated on aluminum foil, and the anode slurry was coated on the electrodeposited copper foils of this disclosure. After the solvents evaporated, the anode and cathode were pressed and slit into certain sizes. Pressing can take place in a roller press where the electrodeposited copper foil and anode materials are passed through the nip of opposed rollers. Any wrinkling or tearing of the metal foil will result in either a defective battery or a battery of lower charge-discharge cycles. Visibly wrinkled metal foils are generally not assembled into a battery. The surface hardness of the deposited (or M- or matte) side resists the formation of wrinkles during the pressing process. Afterwards, cathodes and anodes are alternately stacked with a separator (manufactured by Celgard Company) sandwiched between, and placed in a container molded by laminate film. The container was filled with an electrolyte, and sealed to form a battery. The size of the laminated battery was 41 mm×34 mm×53 mm. The charging mode was the constant current-voltage ("CCCV") mode, the charging voltage was 4.2 V, and the charging current was 5 C. The discharging mode was the constant current ("CC") mode, the discharging voltage was 2.8 V, and the discharging current was 5 C. The charging-discharging test on the batteries was conducted at a high temperature (55° C.). Cycle life is defined as the number of charge-discharge cycles a battery can perform before its nominal capacity falls below 80% of its initial rated capacity. The symbol "O" in Table 2 means cycle number is over 1,000 times. The symbol "X" in Table 2 means cycle number is less 1,000 times.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

It should be understood within the scope of the present disclosure, the above-mentioned technical features and technical features mentioned below (such as example) can be combined freely and mutually to form new or preferred technical solutions, which are omitted for brevity.

We claim:

1. An electrodeposited copper foil having a deposited side and a drum side comprising:
    a specific burst strength measured in accordance with IPC-TM-650 2.4.2 in the range of 1.5 to 4.3 kPa*m$^2$/g;
    a tensile strength in the range of 30.2 to 39.8 kgf/mm$^2$;
    wherein the deposited side exhibits a hardness in the range of 0.2-2.0 GPa by nano indentation analysis measured at a depth of 300 nm; and,
    wherein the electrodeposited copper foil exhibits a reduced copper burr property on a clipping edge of the electrodeposited copper foil, wherein the reduced copper burr property defined as the number of copper burrs per 5 cm of the clipping edge, is in the range of 0~9, and that a maximum length of any copper burr on the clipping edge is 35 µm; and wherein the electrodeposited copper foil, after roll pressing, does not include wrinkles.

2. The electrodeposited copper foil of claim 1 further exhibiting
    an elongation in the range of 5.1 to 21.4%.

3. The electrodeposited copper foil of claim 1, wherein copper burr length is in the range of 1 µm to 35 µm.

4. A current collector for a lithium ion secondary rechargeable battery comprising the electrodeposited copper foil of claim 1.

5. A lithium ion secondary rechargeable battery comprising the current collector of claim 4, exhibiting a charge/discharge cycle life of more than 1000 times.

6. A rechargeable lithium ion secondary battery comprising the electrodeposited copper foil of claim 1 as a component thereof.

7. The rechargeable lithium ion secondary battery of claim 6, wherein the battery is a laminated battery comprising alternating anode and cathode layers, with a separator layer between the alternating anode and cathode layers.

8. The rechargeable lithium ion secondary battery of claim 6 having a charge/discharge cycle life in excess of 1000 times.

9. A capacitor comprising the electrodeposited copper foil according to claim 2
    wherein the capacitor further comprises at least a second copper foil; wherein the electrodeposited copper foil and the at least second copper foil are separated by a dielectric layer.

10. An electrode comprising the electrodeposited copper foil of claim 1 in combination with a pressure consolidated anode active substance.

11. The electrode of claim 10, further comprising an electrically conductive additive.

* * * * *